United States Patent
Kondo et al.

(10) Patent No.: US 9,816,460 B2
(45) Date of Patent: Nov. 14, 2017

(54) ENGINE COVER

(71) Applicants: SUMITOMO RIKO COMPANY LIMITED, Aichi-ken (JP); TOKAI CHEMICAL INDUSTRIES, LTD., Gifu-ken (JP)

(72) Inventors: Hiroyuki Kondo, Gifu-ken (JP); Kimio Ishii, Aichi-ken (JP)

(73) Assignees: SUMITOMO RIKO COMPANY LIMITED, Aichi-Ken (JP); TOKAI CHEMICAL INDUSTRIES, LTD., Gifu-Ken (JP)

( * ) Notice: Subject to any disclaimer, the term of this patent is extended or adjusted under 35 U.S.C. 154(b) by 46 days.

(21) Appl. No.: 14/550,179

(22) Filed: Nov. 21, 2014

(65) Prior Publication Data
US 2015/0075482 A1 Mar. 19, 2015

Related U.S. Application Data

(63) Continuation of application No. PCT/JP2013/074407, filed on Sep. 10, 2013.

(30) Foreign Application Priority Data

Sep. 11, 2012 (JP) .................................. 2012-199529

(51) Int. Cl.
*F16B 21/07* (2006.01)
*F16B 5/06* (2006.01)
(Continued)

(52) U.S. Cl.
CPC .......... *F02F 7/008* (2013.01); *B29C 44/1214* (2013.01); *B29C 44/1261* (2013.01);
(Continued)

(58) Field of Classification Search
CPC ........ F02F 7/008; F02F 7/0085; F02F 7/0073; F02F 7/0065; F02B 77/13; F02B 77/11; F16B 5/0664; F16B 21/073
See application file for complete search history.

(56) References Cited

U.S. PATENT DOCUMENTS

2005/0280195 A1* 12/2005 Huprikar ............... F16F 1/3735
267/141.1
2006/0073310 A1* 4/2006 Winkler .................. F02B 77/13
428/158
(Continued)

FOREIGN PATENT DOCUMENTS

CN 102396023 3/2012
JP 2004-190810 7/2004
(Continued)

OTHER PUBLICATIONS

Search report from PCT/JP2013/074407, dated Dec. 17, 2013.
(Continued)

*Primary Examiner* — Jacob Amick
(74) *Attorney, Agent, or Firm* — Greenblum & Bernstein, P.L.C.

(57) ABSTRACT

The present invention provides an engine cover that can be manufactured easily and at a lower cost and has an attachment member that is high in quality and may not easily fall off. The engine cover has a cover body made of urethane foam, a skin layer disposed on a surface of the cover body, and an attachment member made of an elastic body and integrally molded with the cover body. The attachment member has a recess into which an attachment pin provided to project from an engine member is fitted, and a sealing portion that is provided to project at least one of the opening end surface of the recess and the side surface of the opening end part of the recess and that suppresses entry of a foamed (Continued)

urethane resin material that forms the cover body into the recess during integral molding.

8 Claims, 15 Drawing Sheets

(51) Int. Cl.
   *F02F 7/00* (2006.01)
   *F02B 77/13* (2006.01)
   *B60R 13/08* (2006.01)
   *B29C 44/12* (2006.01)
   *B29K 75/00* (2006.01)

(52) U.S. Cl.
   CPC .......... *B60R 13/0838* (2013.01); *F02B 77/13* (2013.01); *F02F 7/0073* (2013.01); *F02F 7/0085* (2013.01); *F16B 5/0664* (2013.01); *F16B 21/073* (2013.01); *B29C 44/1228* (2013.01); *B29K 2075/00* (2013.01); *B60R 2013/0807* (2013.01); *F05C 2253/20* (2013.01)

(56) References Cited

U.S. PATENT DOCUMENTS

| | | | |
|---|---|---|---|
| 2006/0125286 A1* | 6/2006 | Horimatsu | B60R 13/0206 296/187.03 |
| 2012/0168246 A1 | 7/2012 | Kondo et al. | |

FOREIGN PATENT DOCUMENTS

| | | |
|---|---|---|
| JP | 2005-178134 | 7/2005 |
| JP | 2006-522890 | 10/2006 |
| JP | 2006-336743 | 12/2006 |
| JP | 2008-196587 | 8/2008 |
| JP | 2008-298084 | 12/2008 |
| JP | 2011-21486 | 2/2011 |
| JP | 2012-37001 | 2/2012 |
| JP | 2012-037002 | 2/2012 |
| WO | 2004/090307 | 10/2004 |
| WO | 2008/055806 | 5/2008 |

OTHER PUBLICATIONS

Office Action issued in China Counterpart Patent Appl. No. 201380014739.1, dated Dec. 30, 2015, along with an English translation thereof.
English translation of JP2006-522890, dated Oct. 5, 2006.
International Preliminary Report on Patentability for PCT/JP2013/074407, dated Mar. 17, 2015.
Office Action issued in Japan Counterpart Patent Appl. No. 2012-199529, dated May 31, 2016, along with an English translation thereof.
Search Report issued in European Patent Office (EPO) Patent Application No. 13836351.0, dated Apr. 22, 2016.
Partial English language translation of JP 2004-190810 having a date of Jul. 8, 2004.
Partial English language translation of JP 2008-196587 having a date of Aug. 28, 2008.
Partial English language translation of JP 2008-298084 having a date of Dec. 11, 2008.
Office Action issued in China Counterpart Patent Appl. No. 201380014739.1, dated Sep. 18, 2016, along with an English translation thereof.

* cited by examiner

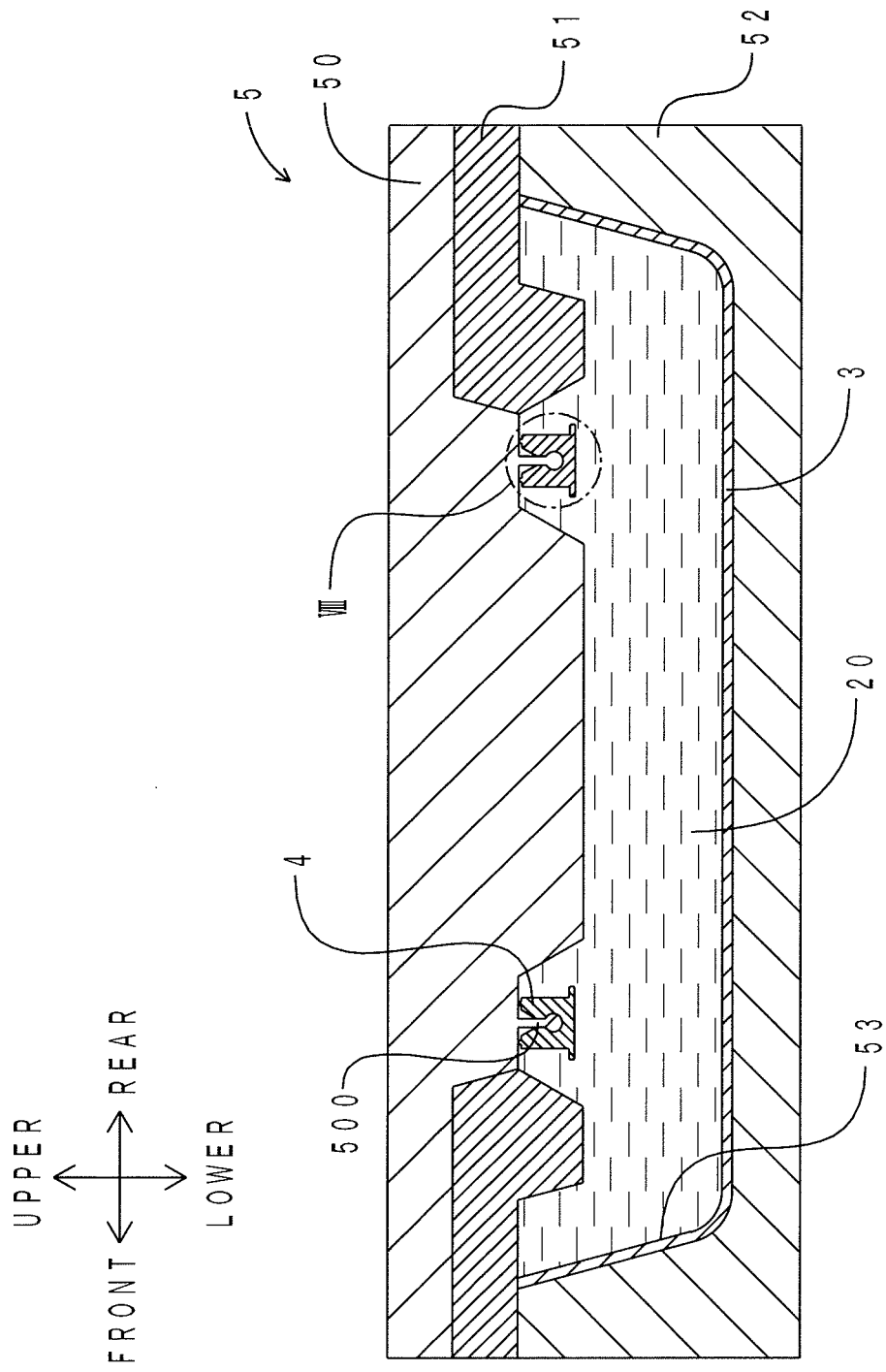

[FIG. 8]
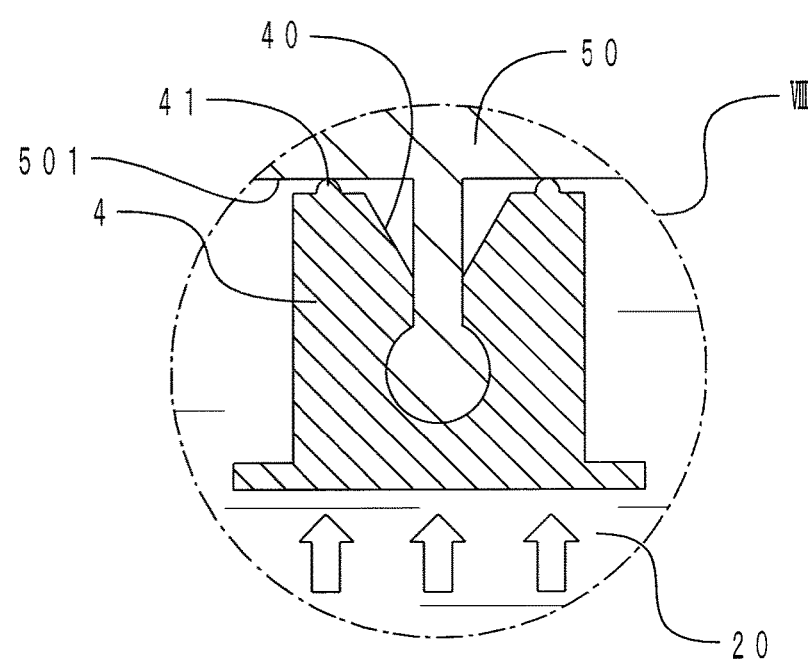

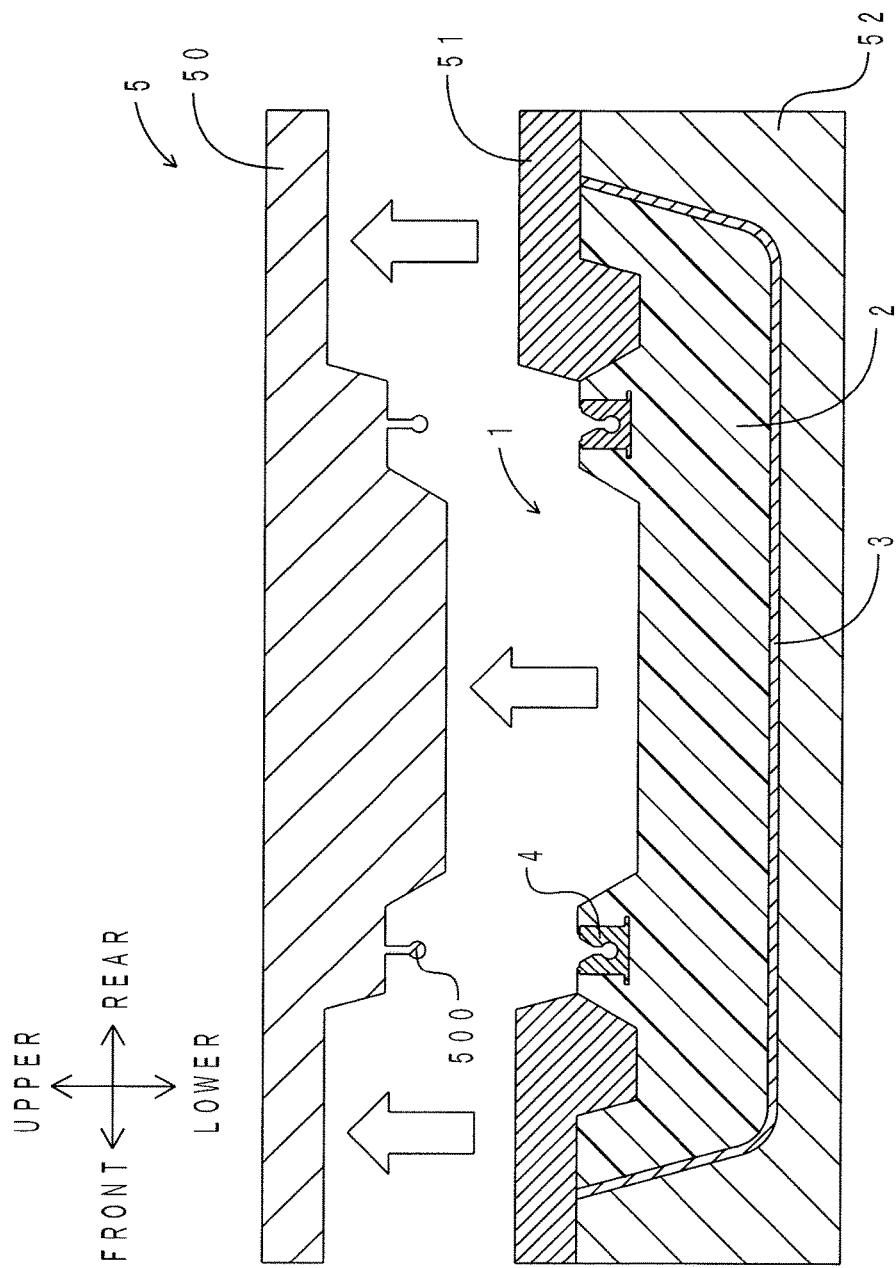

[FIG. 10]
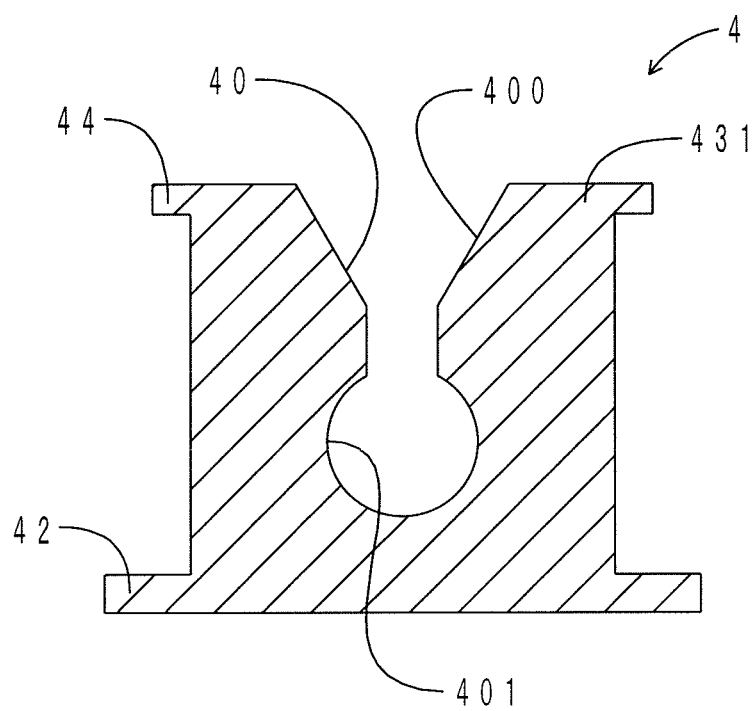

[FIG. 11]
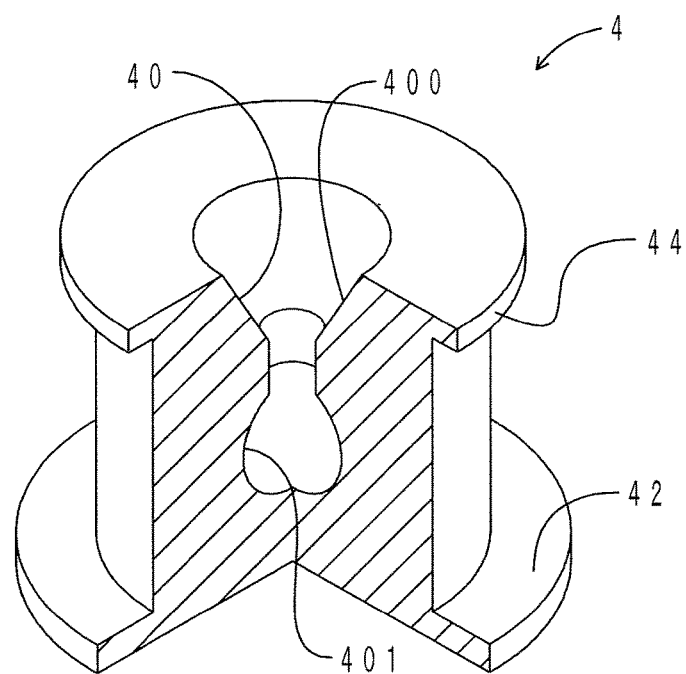

[FIG. 12]
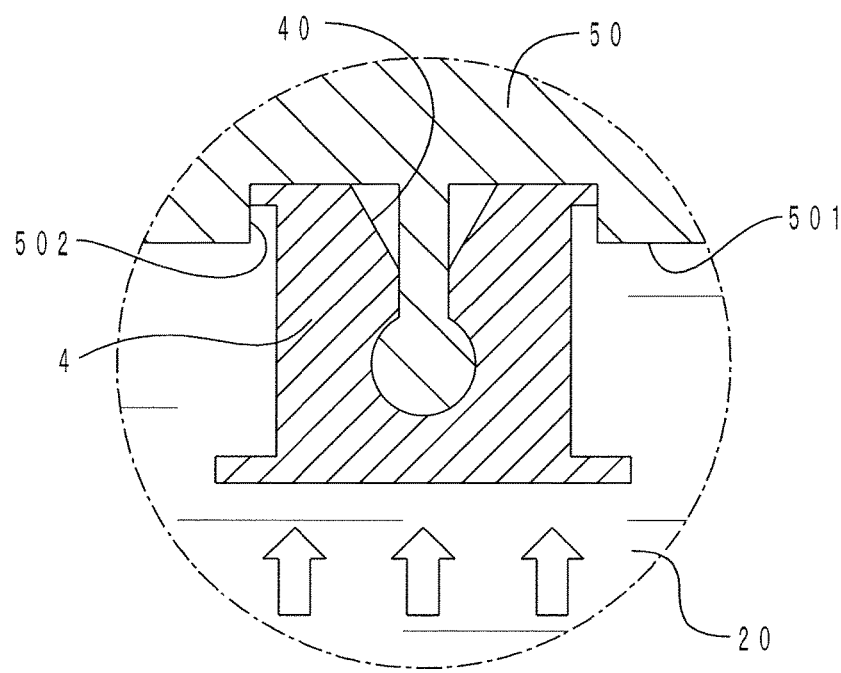

[FIG. 13]
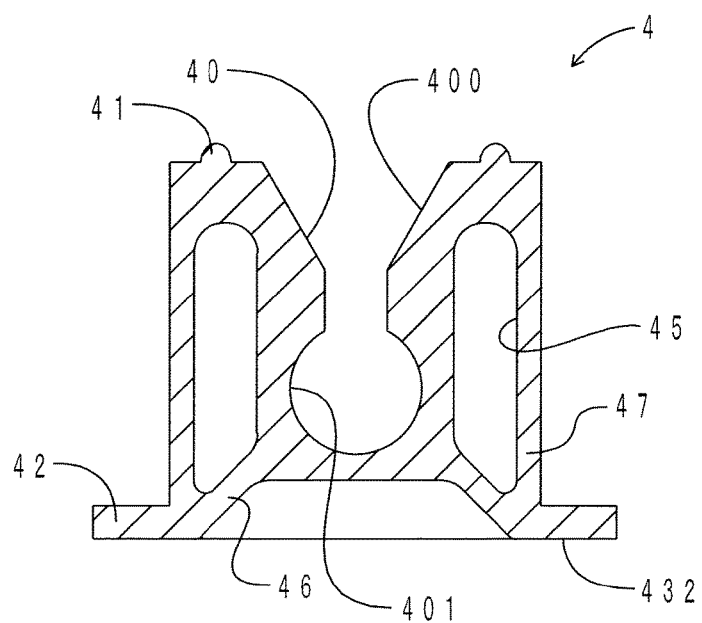

[FIG. 14]
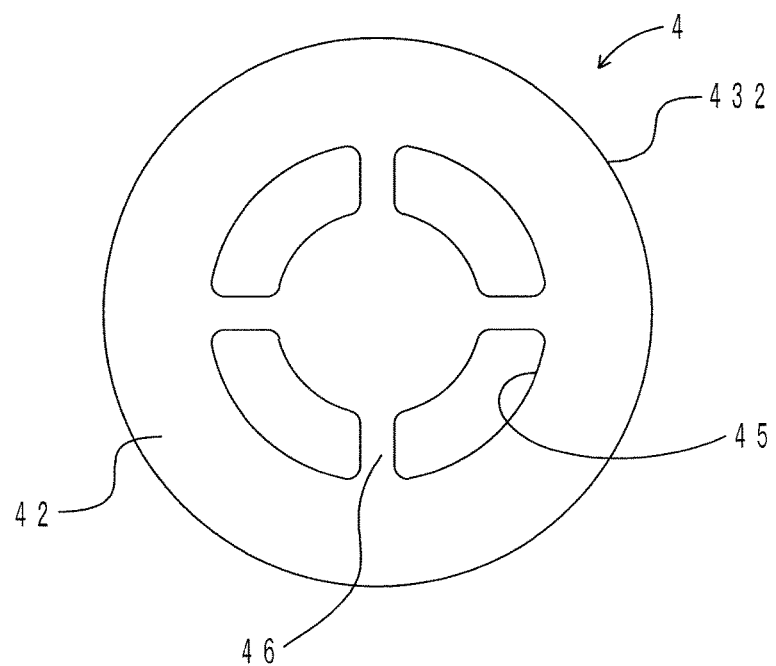

[FIG. 15]
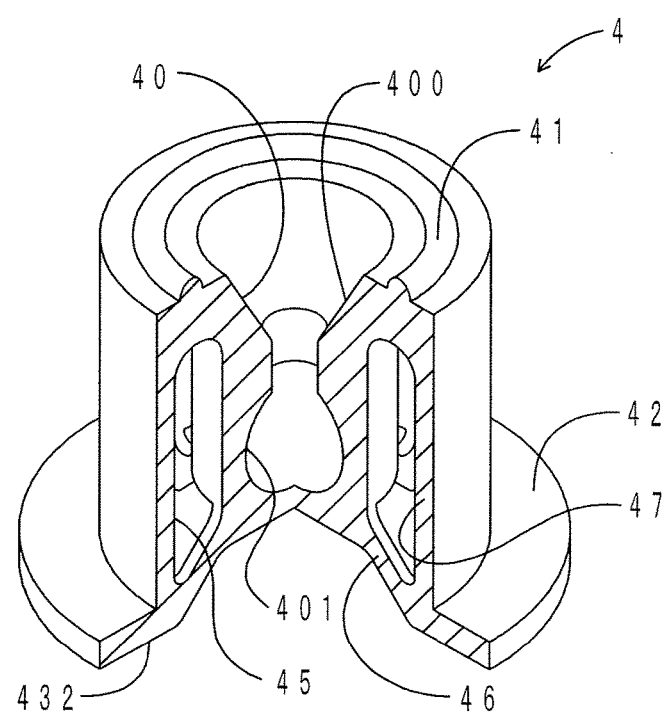

ENGINE COVER

CLAIM FOR PRIORITY

This application is a Continuation of PCT/JP2013/074407 filed Sep. 10, 2013, and claims the priority benefit of Japanese application 2012-199529, filed Sep. 11, 2012, the contents of which is expressly incorporated by reference herein in its entirety.

TECHNICAL FIELD

The present invention relates to an engine cover that is disposed in an engine compartment of a vehicle and that detachably covers an engine member such as a cylinder head cover.

BACKGROUND ART

An engine cover is disposed in an engine compartment of a vehicle. The engine cover is attached to a cylinder head cover of an engine. By covering the cylinder head cover with the engine cover from above, it is possible to suppress the leakage of sound from the engine to the outside, and a design of the engine compartment can be enhanced.

For example, Patent Documents 1 and 2 describe an engine cover having a covering material, an attachment base extending from the covering material, and a rubber grommet secured to the attachment base. An attachment pin is provided to project from the cylinder head cover. The grommet has a recess into which the attachment pin is fitted. By fitting the attachment pin into the grommet, the engine cover is attached to the cylinder head cover.

RELATED ART DOCUMENTS

Patent Documents

Patent Document 1: Japanese Patent Application Publication No. 2006-336743 (JP 2006-336743 A)
Patent Document 2: Japanese Patent Application Publication No. 2011-21486 (JP 2011-21486 A)
Patent Document 3: Published Japanese Translation of PCT Application No. 2006-522890 (JP2006-522890 A)
Patent Document 4: International Patent Application Publication No. 2008/055806

SUMMARY OF THE INVENTION

Problem to be Solved by the Invention

Conventionally, a covering material is manufactured first, then a grommet is attached to an attachment base to manufacture an engine cover. Therefore, the number of processing steps is increased, resulting in a higher cost. In addition, when an engine cover is detached for maintenance, etc., the grommet may be incidentally removed from the attachment base, and be kept fitted to the attachment pin. In this case, the grommet needs to be reattached to the attachment base, which is a cumbersome process. In addition, the covering material is made of polypropylene or polyamide, which is full hard. Accordingly, vibrations generated from the engine are easily transmitted to the engine cover, and secondary sound may be generated from the engine cover.

With regard to this point, Patent Documents 3 and 4 describe an engine cover having a sound absorption layer made of foamed resin. In the engine cover described in Patent Documents 3 and 4, an attachment member (grommet) into which the attachment pin is fitted is disposed in the sound absorption layer. In order to dispose the attachment member in the sound absorption layer, for example, the attachment member is set in a molding die to perform foam molding for a foamable resin material. As described above, however, the attachment member has a recess into which the attachment pin is fitted. Therefore, in the case where foam molding is performed for the foamable resin material so that the attachment member is covered, the formable resin material easily enters the recess due to foaming pressure. As a result, burrs are formed on the periphery of an opening of the recess. Removing the burrs requires a complicated process, and it is difficult to completely remove the burrs from the small attachment member. Therefore, the dimensional accuracy at the recess is lowered, which may cause defects in attachment to occur.

The present invention has been devised in consideration of these issues, and it is an object of the present invention to provide an engine cover that can be manufactured easily and at a lower cost and has an attachment member that is high in quality and may not easily fall off.

Means for Solving the Problem (1) In order to resolve the above problem, an engine cover according to the present invention is characterized by including a cover body made of urethane foam, a skin layer disposed on a surface of the cover body, and an attachment member made of an elastic body and integrally molded with the cover body, wherein the attachment member has a recess into which an attachment pin provided to project from an engine member is fitted, and a sealing portion that is provided to project from at least one of an opening end surface of the recess and a side surface of an opening end part of the recess and that suppresses entry of a foamed urethane resin material that forms the cover body into the recess during integral molding.

In the engine cover according to the present invention, the attachment member into which the attachment pin on the engine member side is fitted is integrally molded with the cover body. Therefore, an operation in which the attachment member is attached after the cover body is manufactured is unnecessary. An attachment base to which the attachment member is secured is also unnecessary. Accordingly, the number of processing steps can be reduced compared to the related art, and the engine cover can be manufactured at a lower cost.

The attachment member is adhered to the cover body by integral molding. Therefore, the attachment member does not easily fall off from the cover body even when the engine cover is detached for maintenance, etc.

Further, the attachment member is formed of an elastic body, whereby vibrations generated from an engine can be absorbed by the attachment member and the cover body. Therefore, the engine cover according to the present invention excels in sound absorption performance.

The attachment member has a sealing portion on at least one of the opening end surface of the recess (the end surface of the attachment member having the opening of the recess) and the side surface of the opening end part of the recess (the end part of the attachment member having the opening of the recess). The sealing portion has a function of suppressing entry of the foamed urethane resin material that forms the cover body into the recess of the attachment member during integral molding. This enables to reduce the amount of burrs formed on the periphery of the opening of the recess.

Accordingly, dimensional accuracy of the recess can be easily maintained. Therefore, in the engine cover according to the present invention, the quality of the attachment member is high, and defects in attachment are unlikely to occur.

(2) In the configuration of (1) above, the sealing portion preferably includes a projection disposed in a ring shape around an opening of the recess on the opening end surface of the recess.

In the case where the engine cover according to the present invention is manufactured, the attachment member is disposed in a molding die to perform foam molding for the foamed urethane resin material. For example, the attachment member is attached to an upper die with the opening end surface of the recess facing up and the foamed urethane resin material is poured into a lower die for foam molding. At this time, the attachment member is pressed from below toward the upper die due to foaming pressure of the foamed urethane resin material. According to this configuration, the projection is disposed on the opening end surface of the recess. The projection is brought into elastic contact with the upper die. The contact area between the projection and the upper die is smaller than that when the entire opening end surface contacts the upper die. Therefore, the projection is pressed into contact with the upper die with large force once the foaming pressure is applied. As a result, the adhesiveness between the projection and the upper die is improved, resulting in excellent sealing performance. Therefore, according to the present configuration, it is possible to effectively suppress entry of the foamed urethane resin material into the recess.

(3) In the configuration of (1) or (2) above, the sealing portion preferably includes a sealing flange disposed on the opening end part of the recess.

As described in the configuration of (2) above, in the case where the attachment member is attached to the upper die with the opening end surface of the recess facing up for foam molding, the sealing flange becomes a barrier that prevents the expanding foamed urethane resin material from flowing from below. This can effectively suppress entry of the foamed urethane resin material into the recess.

(4) In any one of the configurations of (1) to (3) above, the attachment member preferably has a thinning portion around the recess.

It is desirable to improve the adhesive strength between the attachment member and the cover body so that the attachment member does not easily fall off from the cover body. The attachment member according to the present configuration has a thinning portion. Therefore, the foamed urethane resin material enters the thinning portion during integral molding. Accordingly, the adhesion area between the attachment member and the cover body increases, which improves the adhesive strength. Providing the thinning portion also enables the weight of the attachment member to be reduced.

(5) In the configuration of (4) above, the attachment member preferably has a reinforcement rib extending from a periphery of the recess through the thinning portion.

When the engine cover is to be detached, the press-fitted attachment pin needs to be removed from the recess of the attachment member by moving the engine cover. Providing the thinning portion causes the rigidity of the periphery of the recess to decrease. Therefore, the attachment member deforms due to the movement of the engine cover, and the attachment pin may not be easily removed. According to the present configuration, however, the reinforcement rib is disposed at the thinning portion around the recess. Accordingly, the rigidity of the periphery of the recess can be maintained even though the thinning portion is provided.

When the engine cover is to be attached, an operator cannot check the back surface side of the engine cover. That is, the state in which the attachment pin is fitted to the attachment member cannot be visually recognized. According to the present configuration, the rigidity of the periphery of the recess is increased by providing the reinforcement rib. Therefore, an operator can confirm that the engine cover is surely set to the cylinder head cover when the attachment pin is press-fitted into the recess of the attachment member. Accordingly, it becomes easier to determine whether or not the engine cover is securely attached to the cylinder head cover.

(6) In any one of the configurations of (1) to (5) above, the attachment member preferably has a fixing flange on the end part on the opposite side from the opening end part of the recess.

As described in the configuration of (4) above, it is desirable to increase the adhesive strength between the attachment member and the cover body so that the attachment member does not easily fall off from the cover body. A fixing flange is disposed on one end part of the attachment member according to the present configuration so as to extend in a direction in which the diameter is increased. Therefore, the adhesion area between the attachment member and the cover body increases, which improves adhesive strength.

(7) In any one of the configurations of (1) to (6) above, the attachment member is preferably made of thermoplastic elastomer, which can be adhered to the cover body by integral molding.

The attachment member is formed of an elastic body. However, when the attachment member is made of rubber materials such as ethylene propylene diene monomer rubber (EPDM) and nitrile rubber (NBR) used widely as a grommet material, the attachment member cannot be adhered to the cover body made of urethane foam by integral molding. According to the present configuration, however, the attachment member can be adhered to the cover body.

(8) In the configuration of (7) above, the thermoplastic elastomer is preferably urethane elastomer.

The thermoplastic urethane elastomer has the good adhesion to the urethane foam. According to the present configuration, the adhesive strength between the attachment member and the cover body is high, whereby the attachment member does not easily fall off from the cover body.

BRIEF DESCRIPTION OF THE DRAWINGS

FIG. 7 is a cross-sectional view of the molding die in a molding process.

FIG. 8 is an enlarged view of an inside of a circle VIII in FIG. 7.

FIG. 9 is a cross-sectional view of the molding die in a mold opening process.

FIG. 10 is a cross-sectional view of an attachment member in an engine cover according to a second embodiment.

FIG. 11 is a partially cut-out perspective cross-sectional view of the attachment member.

FIG. 12 is an enlarged cross-sectional view of the attachment member and its surroundings in the molding process.

FIG. 13 is a cross-sectional view of an attachment member in an engine cover according to a third embodiment.

FIG. 14 is a bottom view of the attachment member.

FIG. 15 is a partially cut-out perspective cross-sectional view of the attachment member.

DESCRIPTION OF THE REFERENCE NUMERALS

1: Engine Cover, 2: Cover Body, 20: Foamed Urethane Resin Material, 3: Skin Layer, 4: Attachment Member, 40: Recess, 41: Projection, 42: Fixing Flange, 44: Sealing Flange, 45: Thinning Portion, 46: Reinforcement Rib, 47: Side Wall, 400: Taper Portion, 401: Housing Portion, 430: Upper End Surface (Opening End Surface of Recess), 431: Upper End Part (Opening End Part of Recess), 432: Lower End Surface, 5: Molding Die, 50: Upper Die, 51: Intermediate Die, 52: Lower Die, 53: Cavity, 500: Protusion, 501: Lower Surface, 502: Stepped Portion 80: Cylinder Head Cover (Engine Member), 81: Attachment Pin, 810: Leg Portion, 811: Head Portion

MODES FOR CARRYING OUT THE INVENTION

Embodiments of an engine cover according to the present invention will be described below.

First Embodiment

[Structure]

Figure 1:
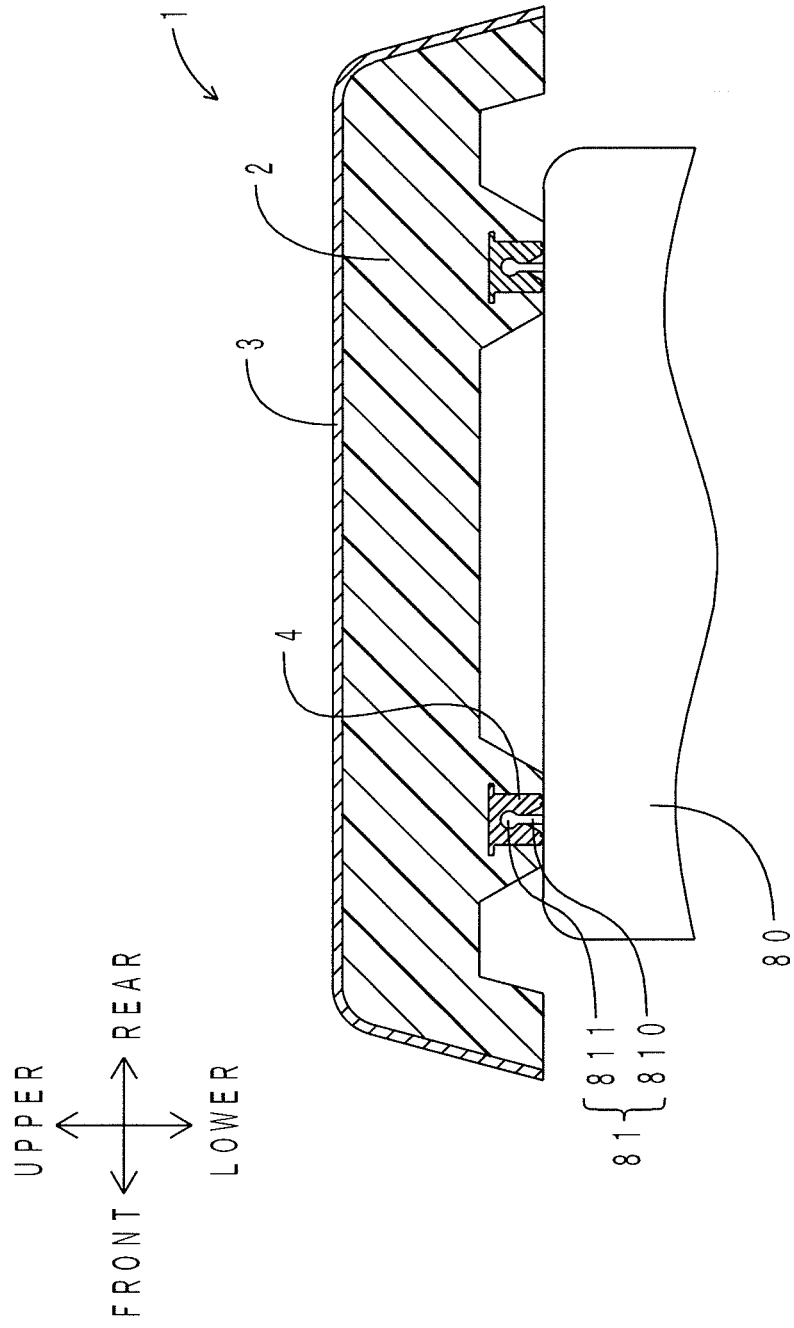
FIG. 1 is a cross-sectional view in a front-rear direction of an engine cover according to a first embodiment, which is attached to an engine member.
Figure 2:
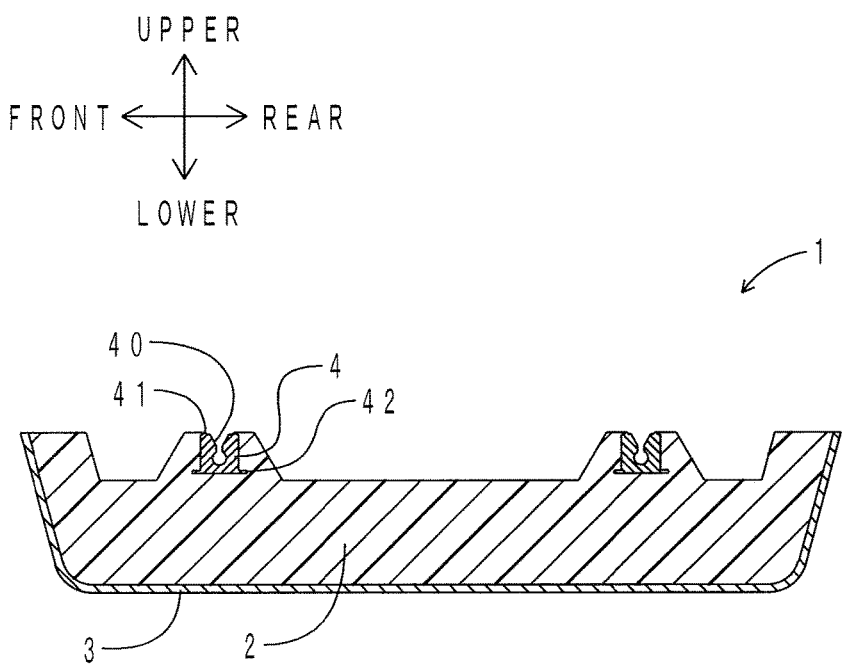
FIG. 2 is a cross-sectional view in the front-rear direction of the engine cover.
Figure 3:
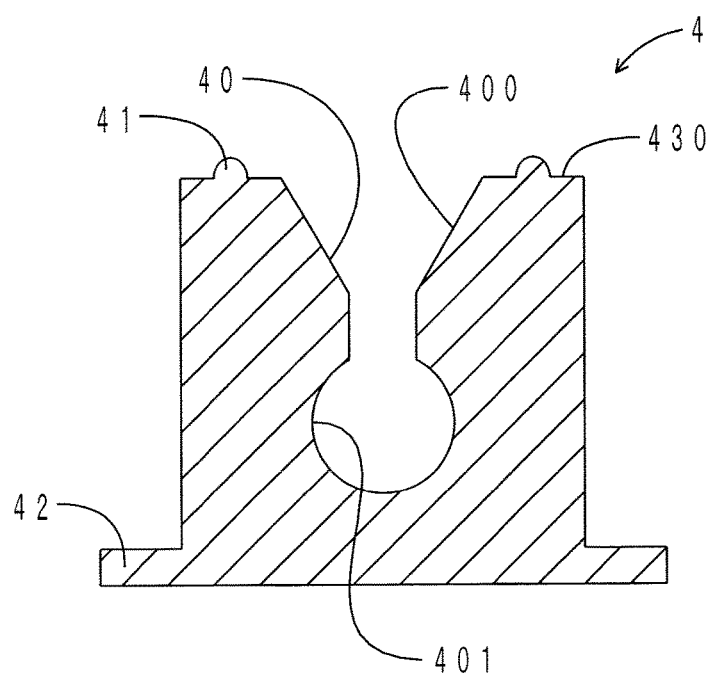
FIG. 3 is a cross-sectional view of an attachment member.
Figure 4:
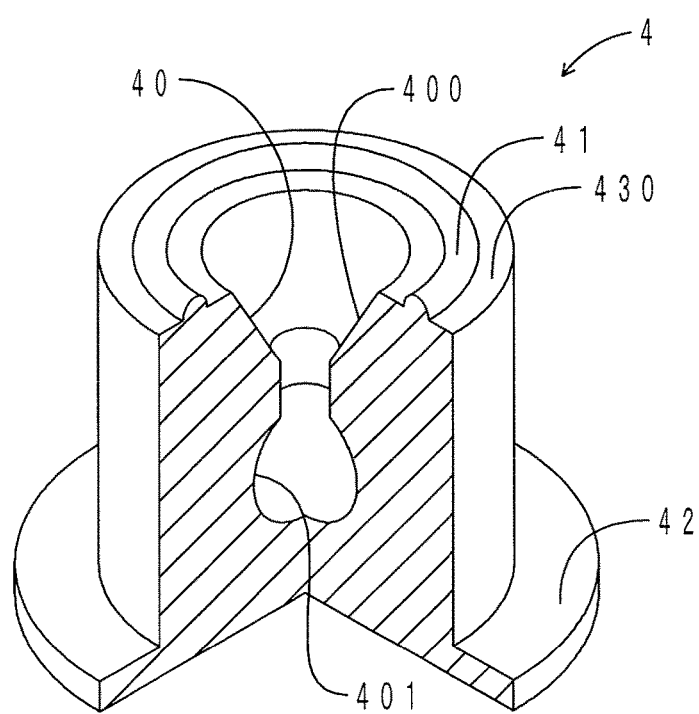
FIG. 4 is a partially cut-out perspective cross-sectional view of the attachment member.

First, structure of an engine cover according to the present embodiment will be described. FIG. 1 is a cross-sectional view in a front-rear direction of the engine cover according to the present embodiment, which is attached to an engine member. FIG. 2 is a cross-sectional view in the front-rear direction of the engine cover. FIG. 3 is a cross-sectional view of an attachment member. FIG. 4 is a partially cut-out perspective cross-sectional view of the attachment member. In FIGS. 1 and 2, for the convenience of explanation, the attachment member is shown in an exaggerated manner. In addition, FIG. 2 shows an upside-down state of the engine cover of FIG. 1. Therefore, the orientation in the vertical direction is opposite between FIG. 1 and FIG. 2.

As shown in FIG. 1, an engine cover 1 is attached to an upper surface of a cylinder head cover 80. The cylinder head cover 80 is included in the concept of the "engine member" of the present invention. Two attachment pins 81 are provided to project from the upper surface of the cylinder head cover 80 in the front-rear direction. The two attachment pins 81 are each made of metal, and each have a leg portion 810 fixed to the cylinder head cover 80 and a head portion 811 in a spherical shape with larger diameter than that of the leg portion 810.

As shown in FIG. 2, the engine cover 1 has a cover body 2, a skin layer 3, and two attachment members 4. The cover body 2 is made of urethane foam with a density of 100 kg/m$^3$ and has the shape of a plate. The skin layer 3 is formed of a urethane resin coating. The skin layer 3 is disposed so as to cover a lower surface (the upper surface in FIG. 1) of the cover body 2. The skin layer 3 is exposed in the engine compartment.

Two attachment members 4 are each embedded in an upper portion of the cover body 2. Each of the two attachment members 4 has the shape similar to a cylinder and is disposed at a position corresponding to the attachment pin 81 of the cylinder head cover 80. Each of the two attachment members 4 is made of thermoplastic urethane elastomer (TPU). The two attachment members have the same structure. Therefore, either one of the attachment members 4 will be described below.

As shown in FIGS. 3 and 4, the attachment member 4 has a recess 40, a projection 41, and a fixing flange 42. The recess 40 is formed recessed downward in the center of an upper end surface 430 of the attachment member 4. An opening of the recess 40 is exposed in the upper surface of the cover body 2. The recess 40 has a taper portion 400 and a housing portion 401. The taper portion 400 is disposed so that the diameter is reduced downwards from the upper end surface 430 of the attachment member 4. The housing portion 401 has a generally spherical shape, and is disposed below the taper portion 400. The inner diameter of the housing portion 401 is generally the same as the outer diameter of the head portion 811 of the attachment pin 81. In a state where the engine cover 1 is attached to the cylinder head cover 80 (see FIG. 1), the head portion 811 of the attachment pin 81 is accommodated in the housing portion 401.

The projection 41 is provided to project from the upper end surface 430 of the attachment member 4. The upper end surface 430 of the attachment member 4 is included in the concept of the "opening end surface of the recess" of the present invention. The projection 41 has the semi-spherical shape in cross section, and is disposed in a ring shape around the opening of the recess 40.

The fixing flange 42 has the circular shape. The fixing flange 42 is disposed around the lower end part of the attachment member 4 so as to extend in the direction in which the diameter is increased. The lower end part of the attachment member 4 is included in the concept of the "end part on the opposite side from the opening end part of the recess" of the present invention.

[Attachment Method]

Next, a method for attaching the engine cover 1 of the present embodiment will be described. First of all, the engine cover 1 is disposed above the cylinder head cover 80 so that the attachment pin 81 is horizontally aligned with the recess 40. Then, the engine cover 1 is pressed against the cylinder head cover 80. Accordingly, the head portion 811 of the attachment pin 81 is press-fitted into the housing portion 401 through the taper portion 400 of the recess 40. The engine cover 1 is thus attached to the cylinder head cover 80.

[Manufacturing Method]

Figure 5:
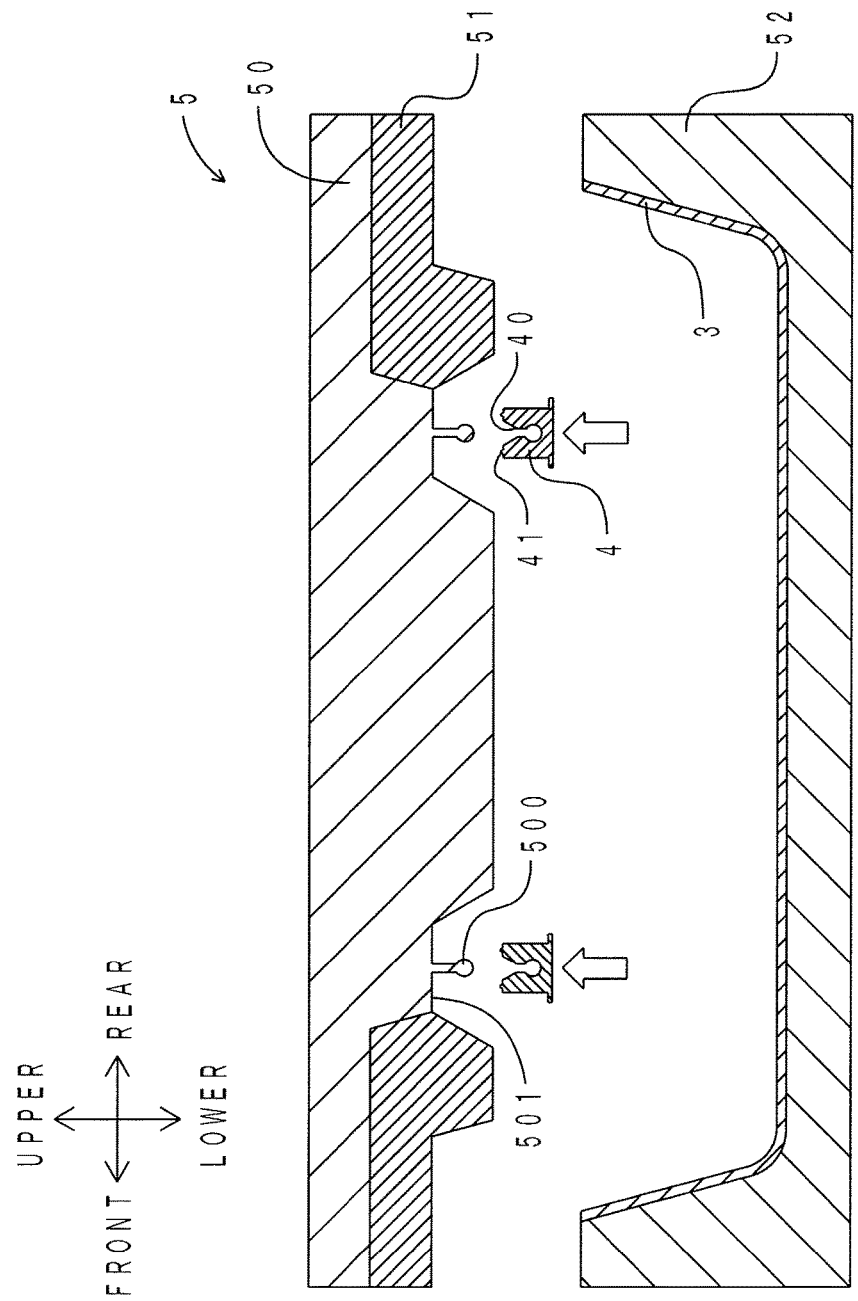
FIG. 5 is a cross-sectional view of a molding die in a placement process.
Figure 6:
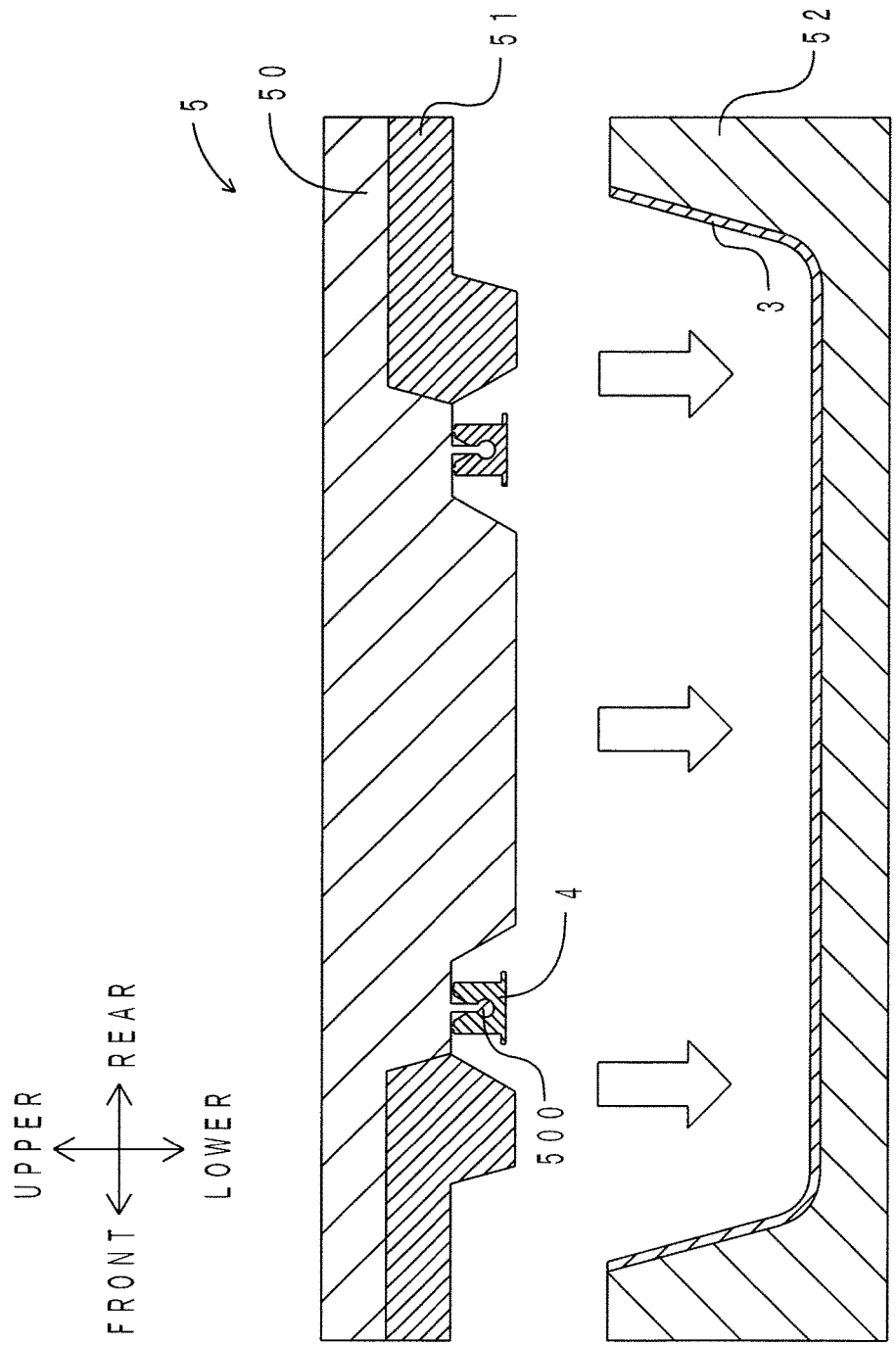
FIG. 6 is a cross-sectional view of the molding die in a mold clamping process.

A method for manufacturing an engine cover 1 of the present embodiment will be described next. The method for manufacturing the engine cover 1 according to the present embodiment includes a placement process, a mold clamping process, a molding process, and a mold opening process. FIG. 5 is a cross-sectional view of a molding die in the placement process. FIG. 6 is a cross-sectional view of the molding die in the mold clamping process. FIG. 7 is a cross-sectional view of the molding die in the molding process. FIG. 8 is an enlarged view of an inside of a circle VIII in FIG. 7. FIG. 9 is a cross-sectional view of the molding die in the mold opening process.

As shown in FIG. 5, a molding die 5 includes an upper die 50, an intermediate die 51, and a lower die 52. A protrusion 500 having the same shape and size as those of the attachment pin 81 is disposed on a lower surface of the upper die 50. In the placement process, first of all, a urethane resin coating is applied to a die surface of the lower die 52 by spraying. A coating film thus formed is then dried to form the skin layer 3 on the die surface of the lower die 52. The intermediate die 51 is fixed to the upper die 50. By press-fitting the protrusion 500 into the recess 40 of the attachment member 4, the attachment member 4 is attached to the upper die 50. At such time, the projection 41 of the attachment member 4 is brought into elastic contact with a lower surface 501 of the upper die 50.

In the mold clamping process, as shown in FIG. 6, a mold clamping is performed by mounting the upper die 50 and the intermediate die 51 on the lower die 52 on which the skin layer 3 is disposed.

In the molding process, as shown in FIG. 7, a foamed urethane resin material 20 is poured into a cavity 53 for foam molding, and the cover body 2 is molded. At such time, as shown in an enlarged view of FIG. 8, the projection 41 of the attachment member 4 is brought into elastic contact with the lower surface 501 of the upper die 50. In addition, the projection 41 is pressed against the lower surface 501 of the upper die 50 from below due to foaming pressure of the foamed urethane resin material 20. The projection 41 is pressed into contact with the lower surface 501 so as to become a barrier. This suppresses entry of the foamed urethane resin material 20 into the recess 40.

In a mold opening process, as shown in FIG. 9, the upper die 50 is removed first. Then, the intermediate die 51 is removed. Finally, the engine cover 1 into which the cover body 2, the skin layer 3, and the attachment member 4 are integrated is taken out. The engine cover 1 shown in FIG. 2 is thus manufactured.

[Operation and Effects]

Next, the operation and effects of the engine cover 1 according to the present embodiment will be described. According to the engine cover 1 of the present embodiment, the attachment member 4 is made of thermoplastic urethane elastomer. The cover body 2 is made of urethane foam. The thermoplastic urethane elastomer has the good adhesion to the urethane foam. Therefore, the attachment member 4 can be adhered to the cover body 2 by integral molding. Further, the adhesive strength between the attachment member 4 and the cover body 2 is high, whereby the attachment member 4 does not easily fall off from the cover body 2 even when the engine cover 1 is detached for maintenance, etc. In addition, vibrations from an engine transmitted through the cylinder head cover 80 can be absorbed by the attachment member 4 and the cover body 2. Therefore, the engine cover 1 excels in sound absorption performance.

According to the engine cover 1 of the present embodiment, it is not necessary to attach the attachment member 4 after the cover body 2 is manufactured. An attachment base that secures the attachment member 4 is also not necessary. Therefore, the number of processing steps can be reduced compared to the related art, and the engine cover 1 can be manufactured at a lower cost.

The engine cover 1 of the present embodiment does not include a full hard covering material but includes the cover body 2 made of urethane foam and the skin layer 3 formed of the urethane resin coating. Therefore, the engine cover 1 is lightweight. The cover body 2 is formed of urethane foam with a density of 100 kg/m$^3$. The cover body 2 is hard compared to the sound absorption layer of the engine cover according to the related art. Thus, appropriate rigidity is applied to the cover body 2 without reducing the sound absorption performance. Accordingly, an excellent sound absorption performance of the engine cover 1 is achieved while the entire shape of the engine cover 1 is kept. Further, the skin layer 3 is formed of a urethane material which is the same as that of the cover body 2. Therefore, the skin layer 3 has the good adhesion to the cover body 2 without affecting the cover body 2 much. According to the urethane resin coating, the coating film that has good flexibility and excels in cold resistance, compared to an acrylic resin coating, can be formed. Therefore, the skin layer 3 excels in flexibility and cold resistance.

The projection 41 is disposed on the upper end surface 430 of the attachment member 4. The projection 41 is brought into elastic contact with the lower surface 501 of the upper die 50. The contact area between the projection 41 and the lower surface 501 is smaller than that when the entire upper end surface 430 contacts the lower surface 501. Therefore, when the foaming pressure is applied during foam molding, the projection 41 is pressed into contact with the lower surface 501 with large force. Accordingly, the adhesiveness between the projection 41 and the lower surface 501 is increased, resulting in excellent sealing performance. This suppresses entry of the foamed urethane resin material 20 into the recess 40 during foam molding. This reduces the amount of burrs formed on the periphery of the opening of the recess 40, and the dimensional accuracy at the recess 40 is easily maintained. Therefore, according to the engine cover 1, the quality of the attachment member 4 is high, and defects in attachment are unlikely to occur.

The engine cover 1 according to the present embodiment is manufactured using the molding die 5 including the upper die 50, the intermediate die 51, and the lower die 52. The attachment member 4 is attached to the lower surface 501 of the upper die 50. In the mold opening process, first of all, the upper die 50 is removed, and then the intermediate die 51 is removed. When the upper die 50 is removed, a molded component (engine cover 1) is prevented from being taken out together with the upper die 50 by holding the molded component with the intermediate die 51. In addition, by using the intermediate die 51, gas can be discharged from between the upper die 50 and the intermediate die 51. Therefore, a short shot of the foamed urethane resin material 20 can be suppressed.

The engine cover 1 according to the present embodiment has the fixing flange 42 on the side of the lower end part of the attachment member 4. Therefore, the adhesion area between the attachment member 4 and the cover body 2 increases, which improves the adhesive strength.

Second Embodiment

An engine cover according to a present embodiment differs from the engine cover according to the first embodiment in that an attachment member is not provided with a projection but provided with a sealing flange. Here, only the differences will be described. FIG. 10 is a cross-sectional view of the attachment member in the engine cover according to the present embodiment. FIG. 11 is a partially cut-out perspective cross-sectional view of the attachment member. In FIG. 10, components corresponding to those of FIG. 3 are denoted by the same reference numerals. In FIG. 11, components corresponding to those of FIG. 4 are denoted by the same reference numerals.

As shown in FIGS. 10 and 11, an attachment member 4 has a recess 40, a sealing flange 44, and a fixing flange 42.

The sealing flange 44 has the circular shape. The sealing flange 44 is disposed around an upper end part 431 of the attachment member 4 so as to extend in a direction in which the diameter is increased. The upper end part 431 of the attachment member 4 is included in the concept of the "opening end part of the recess" of the present invention.

The engine cover according to the present embodiment is manufactured in the same process as that of the engine cover according to the first embodiment. FIG. 12 is an enlarged cross-sectional view of the attachment member and its surroundings in the molding process. In FIG. 12, components corresponding to those of FIG. 8 are denoted by the same reference numerals.

As shown in FIG. 12, a lower surface 501 of an upper die 50 has a stepped portion 502 in an area in which the attachment member 4 is disposed. The side peripheral surface of the sealing flange 44 is brought into elastic contact with the stepped portion 502. The sealing flange 44 is pressed into contact with the lower surface 501 of the upper die 50 including the stepped portion 502 during foam molding. The sealing flange 44 becomes a barrier, and this suppresses entry of the foamed urethane resin material 20 into the recess 40.

The engine cover according to the present embodiment has the same operation and effects as those of the engine cover according to the first embodiment with respect to portions with common structures. Further, the sealing flange 44 is disposed as a sealing portion in the periphery of the upper end part 431 of the attachment member 4 according to the present embodiment. The sealing flange 44 becomes a barrier that prevents the expanding foamed urethane resin material 20 from flowing from below. This suppresses entry of the foamed urethane resin material 20 into the recess 40.

Third Embodiment

An engine cover according to a present embodiment differs from the engine cover according to the first embodiment in that an attachment member has a thinning portion and a reinforcement rib. Here, only the differences will be described. FIG. 13 is a cross-sectional view of an attachment member in an engine cover according to the present embodiment. FIG. 14 is a bottom view of the attachment member. FIG. 15 is a partially cut-out perspective cross-sectional view of the attachment member. In FIG. 13, components corresponding to those of FIG. 3 are denoted by the same reference numerals. In FIG. 15, components corresponding to those of FIG. 4 are denoted by the same reference numerals.

As shown in FIGS. 13 to 15, an attachment member 4 has a recess 40, a projection 41, a fixing flange 42, a thinning portion 45, and reinforcement ribs 46. The thinning portion 45 is disposed so as to surround the recess 40. Four of the reinforcement ribs 46 are disposed in total. The reinforcement ribs 46 are disposed so as to divide the thinning portion 45 around the housing portion 401 into four sections when viewed from a lower end surface (bottom surface) 432 of the attachment member 4. The reinforcement ribs 46 are each disposed so as to pass through the thinning portion 45 and connect the periphery of the housing portion 401 and a side wall 47. The engine cover according the present embodiment is manufactured in the same method as that of the engine cover according to the first embodiment.

The engine cover according to the present embodiment has the same operation and effects as those of the engine cover according to the first embodiment with respect to portions with common structures. In addition, the attachment member 4 according to the present embodiment has the thinning portion 45. Therefore, the attachment member 4 can be lightweight accordingly. The foamed urethane resin material 20 enters the thinning portion 45 during foam molding. Therefore, the adhesion area between the attachment member 4 and the cover body 2 increases, and the attachment member 4 and the cover body 2 can be adhered to each other more securely. Further, the attachment member 4 according to the present embodiment has reinforcement ribs 46. This maintains the rigidity of the periphery of the recess 40 even though the thinning portion 45 is disposed around the recess 40. In addition, because the rigidity of the periphery of the recess 40 is high, an operator can confirm that the engine cover is surely set to the cylinder head cover when a head portion 811 of the attachment pin 81 is press-fitted into the housing portion 401 of the recess 40 during the attachment of the engine cover. Therefore, it becomes easier to determine whether or not the engine cover is securely attached to the cylinder head cover.

Other Embodiments

Embodiments of the engine cover in the present invention were described above. However, the embodiments of the present invention are not particularly limited to the embodiments described above. The present invention can be embodied in various modifications or improvements that can be achieved by those skilled in the art.

For example, the material of the attachment member is not particularly limited as far as it is elastic and can be adhered to the cover body by integral molding. As the sealing portion of the attachment member, in the first and third embodiments described above, a projection is disposed on the opening end surface of the recess, and in the second embodiment, a sealing flange is disposed on the opening end part of the recess. The size and shape of the projection and the sealing flange, etc. are not particularly limited. As a sealing portion, the attachment member may have both a projection disposed on the opening end surface of the recess and a sealing flange disposed on the opening end part of the recess.

According to the third embodiment described above, the attachment member is provided with the thinning portion and the reinforcement rib. However, a mode for disposing the thinning portion and the reinforcement rib is not particularly limited. For example, only the thinning portion may be disposed, and the reinforcement rib may not be disposed. In the case where the reinforcement rib is disposed, its shape and number may be determined as necessary in consideration of the rigidity and the like of the periphery of the recess.

According to the above embodiments, the fixing flange is disposed at the end part on the opposite side from the opening end part of the recess. However, the fixing flange is not particularly necessary. From the viewpoint of improving the adhesiveness between the attachment member and the cover body by enlarging the adhesion area between the attachment member and the cover body, a projection and the like may also be disposed on the side or the bottom of the attachment member.

The density of urethane foam that forms the cover body is not particularly limited. As described in the above embodiments, in the case where a skin layer is formed of a coating, the density of urethane foam may be set as 80 kg/m$^3$ or more to 120 kg/m$^3$ or less from the viewpoint of achieving an excellent sound absorption performance of the cover body and keeping the entire shape of the cover body.

The coating that forms the skin layer is not limited to the urethane resin coating. For the skin layer, various coatings that can be adhered to the cover body, such as an acrylic resin coating, can be used. The skin layer may not be formed of a coating but be formed by molding the resin separately. In such a case, the skin layer formed by molding the resin is disposed in a molding die to perform foam molding for the foamed urethane resin material. Alternatively, the skin layer formed by molding the resin may be adhered to the cover body into which the attachment member is integrated.

The engine member, to which the engine cover is to be attached, may include an intake manifold, wire harnesses, brackets, and the like, in addition to a cylinder head cover.

The invention claimed is:

1. An engine cover comprising:
a cover body made of urethane foam,
a skin layer disposed on a surface of the cover body, and
a solid attachment member made of an elastic body and integrally molded with the cover body, wherein
the attachment member has a recess into which an attachment pin provided to project from an engine member is fitted, and a sealing portion that is provided to project from at least one of an opening end surface of the recess and a side surface of an opening end part of the recess and that suppresses entry of a foamed urethane resin material that forms the cover body into the recess during integral molding,
the recess has a taper portion and a housing portion, the taper portion is disposed so that a diameter of the taper portion is reduced in a depth direction from the opening end surface of the recess, and the housing portion has a generally spherical shape and is disposed on a deeper side with respect to the taper portion in the depth direction of the recess, and
the attachment member has a closed end surface on an opposite side of the opening end surface of the recess such that the recess only partially penetrates the attachment member in the depth direction
wherein
the sealing portion includes a sealing flange disposed on the opening end part of the recess, and
the attachment member has a solid body portion that is continuous in the depth direction of the recess between the opening end surface and the closed end surface, wherein the solid body portion has a thickness that is equal to or more than a length of the sealing flange in a radial direction.

2. The engine cover according to claim 1, wherein
the sealing portion includes a projection disposed in a ring shape around an opening of the recess on the opening end surface of the recess, and
wherein the attachment member is continuously solid from the projection to the closed end surface.

3. The engine cover according to claim 1, wherein
the attachment member has a thinning portion around the recess.

4. The engine cover according to claim 3, wherein
the attachment member has a reinforcement rib extending from a periphery of the recess through the thinning portion.

5. The engine cover according to claim 1, wherein
the attachment member has a fixing flange on an end part on the opposite side from the opening end part of the recess.

6. The engine cover according to claim 1, wherein
the attachment member is made of thermoplastic elastomer, which can be adhered to the cover body by integral molding.

7. The engine cover according to claim 6, wherein
the thermoplastic elastomer is urethane elastomer.

8. The engine cover according to claim 2, wherein
the projection is provided to project in an opposite direction from the depth direction of the recess, and has a semi-spherical shape in cross section.

* * * * *